C. M. SPENCER.
METAL WORKING MACHINE.
APPLICATION FILED JULY 27, 1910.
988,670.
Patented Apr. 4, 1911.
2 SHEETS—SHEET 1.
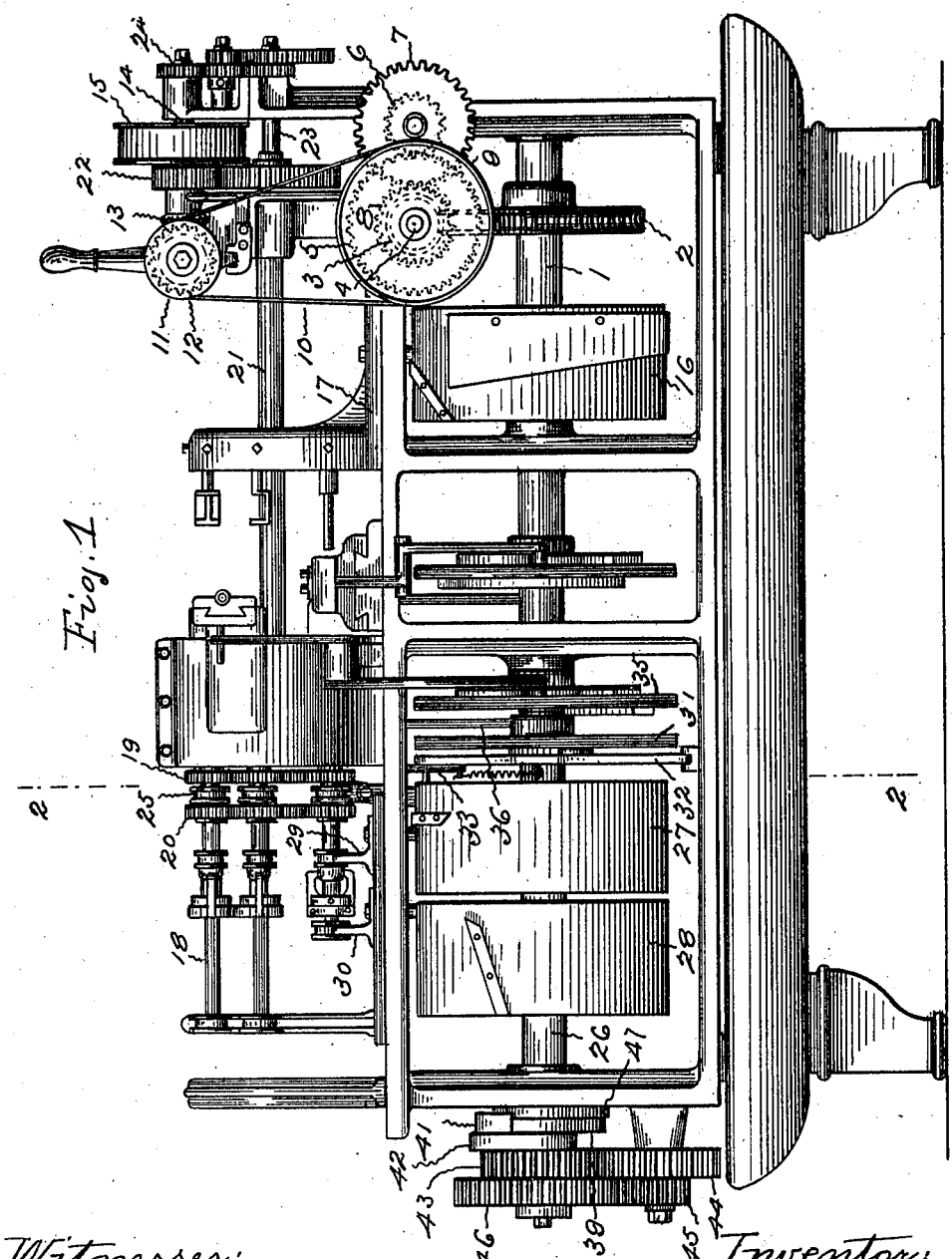

C. M. SPENCER.
METAL WORKING MACHINE.
APPLICATION FILED JULY 27, 1910.
988,670.
Patented Apr. 4, 1911.
2 SHEETS—SHEET 2.
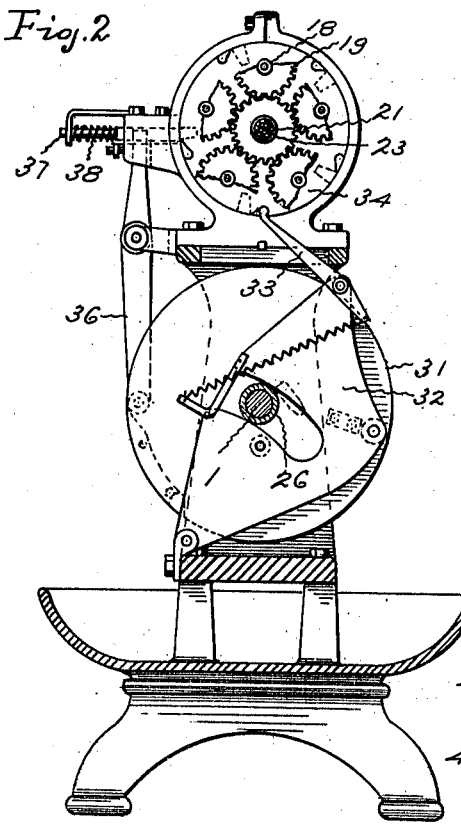
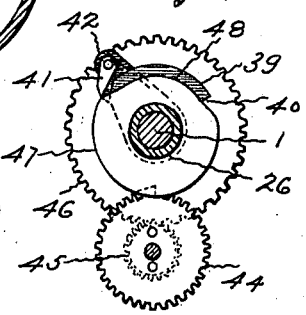
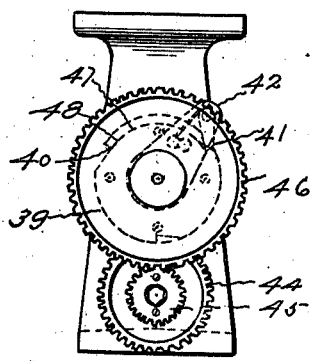
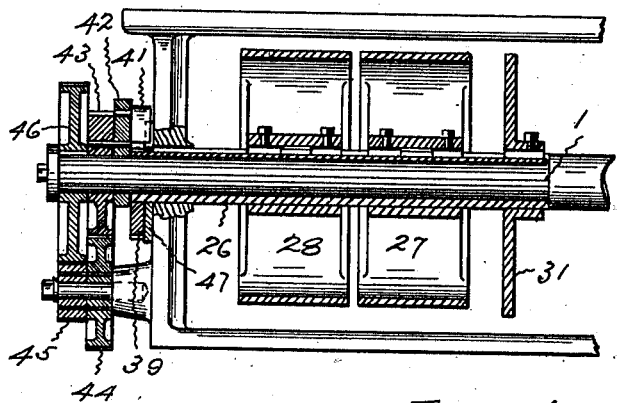

UNITED STATES PATENT OFFICE.

CHRISTOPHER M. SPENCER, OF WINDSOR, CONNECTICUT, ASSIGNOR TO THE UNIVERSAL MACHINE SCREW COMPANY, OF HARTFORD, CONNECTICUT, A CORPORATION OF CONNECTICUT.

METAL-WORKING MACHINE.

988,670. Specification of Letters Patent. Patented Apr. 4, 1911.

Application filed July 27, 1910. Serial No. 574,201.

*To all whom it may concern:*

Be it known that I, CHRISTOPHER M. SPENCER, a citizen of the United States, residing at Windsor, in the county of Hartford and State of Connecticut, have invented a new and useful Improvement in Metal-Working Machines, of which the following is a specification.

This invention relates to the operating mechanism of an automatic multiple spindle screw machine of the type which is constructed to intermittently feed continuous lengths of rods through rotatory and revoluble spindles.

The invention is illustrated and described herein as adapted to such a machine as was invented by me and is claimed in Patent No. 816,510, March 27, 1906. In machines of this character the rods are automatically fed, intermittently, through spindles which are provided with chucks that, at the proper times, are opened to permit the feed of the rods and closed to grip the rods. The spindles are continuously rotated in one direction, while the ends of the rods are being shaped, and are rotated oppositely whenever threads are cut on the rods. The head which carries the spindles is rotatably mounted, and at the proper intervals is unlocked and given a partial rotation for carrying the stock from tool to tool; the head being locked while the tools are performing their work. The end tools are advanced to the rods for cutting, and retracted from the rods to permit indexing, while the spindle head is at rest, such distances and at such speeds as is necessitated by the character of the work which they are to perform, and the spindle head is given its rotary movement for carrying the rods into line with the several end tools, after those tools have been drawn back and are at rest.

The object of this invention is to provide a mechanism for rotating the spindle carrying head, for opening and closing the rod gripping chucks in the spindles, and for feeding the rods through the spindles when the chucks are opened, which mechanism will act to perform its necessary functions for accomplishing the indexing, chucking and feeding of the rods intermittently and very quickly, independently of the movements of the cutting tools, whereby time is gained for the movement of the tools, and the efficiency of the machine is increased. This object is attained by arranging a continuously and uniformly moving driving mechanism in such manner that it imparts intermittent but uniform rotatory movements to the cams which actuate the indexing, chucking and feeding mechanisms. By the use of such an intermittent drive for actuating these mechanisms, the speed at which they are driven can be greatly increased without employing a variable or change speed mechanism for driving the whole machine. And as a result of this increased speed of action of the mechanisms enumerated, more time can be allowed for the movements of the tools. This makes it possible to increase the length of, and consequently decrease the pitch of, the tool-carrying-slide cams, which enables the machine to be run faster without increasing the rankness of the cutting action of the tools.

Figure 1 of the accompanying drawings shows a side elevation of a machine of the type set forth in the patent above referred to, constructed according to this invention. Fig. 2 shows a section on the plane indicated by the dotted line 2—2 on Fig. 1. Fig. 3 shows a longitudinal section of the feeding and chucking cam drums and the indexing cam disk, also the constant speed mechanism for intermittently driving these parts. Fig. 4 shows an end view of the mechanism for driving the feeding, chucking and indexing cam drums and disk. Fig. 5 shows a view of the feeding, chucking and indexing gears, ratchet wheel, pawl and pawl cam.

In the machine illustrated, the main shaft 1 bears a worm wheel 2 in mesh with which is a worm 3 that is keyed to a shaft 4 which bears a gear 5. This gear meshes with a pinion 6 attached to the gear 7 that is driven by a gear 8. This last gear is fastened to the pulley 9 which is loose on the worm shaft 4 and is driven by a belt 10 from a pulley 11 attached to a beveled gear 12 which engages a beveled pinion 13 on the shaft 14 bearing the driving pulley 15, Fig. 1. Fastened to the main shaft 1 is the drum 16 provided with suitable cam blocks arranged to move the tool carrying slide 17 back and forth at the proper time. This mechanism rotates the tool slide cam drum at a uniform rate of speed, but of course the amount of movement and speed of the movement forward and back of the tool slide depends upon the adjustment of the cam blocks on the drum.

The tubular spindles 18 are provided with a set of intermeshing gears 19 and a set of intermeshing gears 20. The former set are rotated in one direction by a central gear on the tubular shaft 21, which is driven by the gearing 22, and the latter set are rotated more slowly in the opposite direction by a central gear on a solid shaft 23 that extends through the tubular shaft and is driven by the gearing 24. The spindle rotating trains of gears are connected and disconnected with the spindles at the proper time by suitably actuated clutches 25. This mechanism for rotating the spindles, first in one direction and then in the other direction, is not more fully described herein, as it is well understood and is fully set forth in the patent previously referred to.

On the tool-feed cam-shaft 1 is a tubular shaft 26, fastened to which are the drums 27 and 28, the former of which bears cam blocks arranged to actuate the chuck operating slide 29 while the latter bears cam blocks arranged to operate the rod feed slide 30. The details of the chucking, and the rod feeding mechanisms are not illustrated and explained for they are of a common form, well known to those skilled in the art, and are set forth in the prior patent. On the tubular cam shaft is a disk 31 bearing cam blocks which are arranged to actuate the lever 32 that carries the index pawl 33, and at the proper intervals impart the intermittent rotatory movements to the head 34 for the purpose of revolving the spindles so that the rods will be successively presented to the several tools. On the cam disk 35 are blocks arranged to actuate the lever 36 which withdraws the bolt 37 so as to permit the head to be rotated. A spring 38 causes the bolt to engage and lock the head in the usual manner, so as to hold it in exact position while the tools are operating on the ends of the rods.

Keyed upon the end of the tubular shaft is a ratchet wheel 39 with three notches 40. Adapted to engage these notches is a pawl 41 that is carried by an arm 42 which is loosely mounted on the tool feed cam shaft and is connected with and revolved by the gear 43, which is also loose upon that shaft. This gear is engaged by a gear 44 which is pinned to a pinion 45. Meshing with this pinion is a gear 46 that is keyed to and is driven by the tool feed cam shaft. In the particular mechanism illustrated, the gearing is designed three to one. Consequently, when the indexing, chucking and feeding cam shaft is driven, its speed is three times as fast as the speed of the tool-cam shaft.

Fixed to the frame is a cam disk 47. The low part 48 of this cam disk is equal to one-third of the circumference of the ratchet wheel that is keyed to the tubular shaft. The pawl is made wider than the ratchet wheel and overlaps this cam disk. As a result of this, the pawl during each revolution only drives the ratchet wheel and the connected cam shaft one-third of a revolution, the pawl being lifted by the fixed cam disk so as to be disengaged from the ratchet wheel during two-thirds of each of its revolutions. This gives the tubular cam shaft three equal intermittent movements during each revolution. As the pawl makes three revolutions, (with the gearing proportioned as shown), to one revolution of the tool cam shaft, and as it engages and drives the ratchet wheel (illustrated) only one-third of a revolution at each engagement, the tubular shaft which bears the indexing, chucking, and feeding cams, travels at a speed three times as fast as the solid shaft which carries the tool feeding cams, and accomplishes the function of indexing, chucking and feeding in one ninth of a revolution of the solid shaft which accomplishes the advancement and withdrawal of the tools. This allows the cams for feeding and withdrawing the tools, to extend about eight-ninths of the periphery of the tool slide cam drum, without overlapping any of the operations of indexing, chucking and feeding the rods, with the operations of feeding and retracting the tools. With one set of operations taking place at a different time and independently of the other, the machine can be run with a minimum amount of power, as the main shaft is not subjected at any one time to a multiplicity of strains due to simultaneous or coincidently performed operations. Furthermore as the length of the tool feeding cams can be so increased, their pitch can be reduced, allowing the machine to be run faster without causing the tools to feed so rapidly as to cut rankly.

The invention claimed is:

1. The combination in a multiple spindle screw machine, of a shaft bearing cams for advancing and retracting the tools, a shaft bearing cams for indexing, chucking and feeding the stock, and mechanism connecting said shafts and causing the second mentioned shaft to be rotated intermittently by, but at a higher speed than, the first mentioned shaft.

2. The combination in a multiple spindle screw machine, of a shaft bearing cams for advancing and retracting the tools, a shaft bearing cams for indexing, chucking and feeding the stock, gearing continuously rotated from the first mentioned shaft, and means actuated by said gearing for imparting intermittent rotary movements to the second mentioned shaft.

3. The combination in a multiple spindle screw machine, of a shaft bearing cams for advancing and retracting the tools, a shaft bearing cams for indexing, chucking and feeding the stock, gearing continuously driven from the first mentioned shaft, and means actuated by said gearing for imparting faster intermittent rotary movements to the second mentioned shaft.

4. The combination in a multiple spindle screw machine, of a shaft bearing cams for advancing and retracting the tools, a shaft bearing cams for indexing, chucking, and feeding the stock, gearing driven by the first mentioned shaft, and a ratchet and pawl mechanism operated by said gearing for imparting intermittent rotary movements to the second mentioned shaft.

5. The combination in a multiple spindle screw machine, of a shaft bearing cams for advancing and retracting the tools, a shaft bearing cams for indexing, chucking and feeding the stock, gearing driven from the first mentioned shaft, a pawl rotated by said gearing at a greater speed than the rotation of the first mentioned shaft, and a ratchet wheel mounted upon the second mentioned shaft and adapted to be engaged and moved by the pawl.

6. The combination in a multiple spindle screw machine, of a shaft bearing cams for advancing and retracting the tools, a tubular shaft mounted on the first mentioned shaft and bearing cams for indexing, chucking and feeding the stock, gearing connecting said shafts and causing the second mentioned shaft to be rotated intermittently by and at a higher rate of speed than the first mentioned shaft.

7. The combination in a multiple spindle screw machine, of a shaft, a drum mounted on said shaft, cams for advancing and retracting the tools fixed to said drum, a tubular shaft on said first mentioned shaft, cam drums mounted on said tubular shaft, cams for chucking and feeding the stock fixed to said drums, a disk mounted on said tubular shaft, cams for indexing the stock fixed to said disk, gearing continuously driven from the first mentioned shaft, and a ratchet and pawl mechanism actuated by said gearing for intermittently rotating said tubular shaft.

8. The combination in a multiple spindle screw machine, of a shaft bearing cams for advancing and retracting the tools, a shaft bearing cams for indexing the stock, gearing connecting said shafts and driving the second mentioned shaft intermittently at a higher rate of speed than the speed of rotation of the first mentioned shaft.

CHRISTOPHER M. SPENCER.

Witnesses:
   JOSEPHINE M. STREMPFER,
   HARRY R. WILLIAMS.

---

Copies of this patent may be obtained for five cents each, by addressing the "Commissioner of Patents, Washington, D. C."